US006407196B1

(12) United States Patent
Shen et al.

(10) Patent No.: US 6,407,196 B1
(45) Date of Patent: Jun. 18, 2002

(54) EMULSIFIABLE ISOCYANATE COMPOSITIONS

(75) Inventors: Chin-Chang Shen, Rochester, MI (US); James A. Yavorsky, Mickleton, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/766,957

(22) Filed: Jan. 22, 2001

Related U.S. Application Data

(63) Continuation of application No. PCT/US99/16658, filed on Jul. 23, 1999.
(60) Provisional application No. 60/093,777, filed on Jul. 23, 1998.

(51) Int. Cl.$^7$ ................................. C08G 18/48
(52) U.S. Cl. .................... 528/49; 252/182.22; 254/591; 254/543; 528/45; 528/74.5; 560/26; 516/53; 516/203; 525/123; 525/454
(58) Field of Search ............... 252/182.22; 524/591, 524/543; 528/45, 49, 34.5; 560/26; 516/53, 203; 525/454, 123

(56) References Cited

U.S. PATENT DOCUMENTS 4,663,377 A * 5/1987 Hombach et al.
5,808,131 A * 9/1998 Gruenbauer et al.

FOREIGN PATENT DOCUMENTS

| EP | 0 013 112 | 7/1980 | ....... C07C/119/042 |
| EP | 0 718 380 | 6/1996 | ............ C09D/5/06 |
| GB | 1444933 | 8/1976 | ........... B01F/17/42 |
| WO | WO 93/03082 | 2/1993 | ............ C08G/18/79 |
| WO | 93/03082 | * 2/1993 | |
| WO | WO 98/06770 | 2/1998 | ............ C08G/18/28 |

* cited by examiner

Primary Examiner—Rachel Gorr
(74) Attorney, Agent, or Firm—Kevin J. Boland

(57) ABSTRACT

The disclosed invention relates to polyisocyanate derived adducts and to emulsifiable polyisocyanates formed from those adducts. The invention further relates to emulsions which include the emulsifiable polyisocyanates. Emulsions which employ the emulsifiable polyisocyanates have greatly increased stability.

55 Claims, No Drawings

EMULSIFIABLE ISOCYANATE COMPOSITIONS

This application is a continuation of international application number PCT US99/16658, filed Jul. 23, 1999, and claims the benefit of U.S. Provisional Application No. 60/093,777, filed Jul. 23, 1998.

TECHNICAL FIELD

This invention relates to polyisocyanate derived adducts, to emulsifiable polyisocyanates which employ those adducts, and to emulsions which include the emulsifiable polyisocyanates.

BACKGROUND ART

The use of water based coatings is important due to environmental considerations. In the case of isocyanate-reactive coatings, however, water presents a problem in that the isocyanate groups react with water. In order to overcome this disadvantage, the prior art has used emulsifiable adducts which are the reaction products of polyisocyanates and hydroxy functional polyethers. These adducts have latent isocyanate functionality to assist in crosslinking of the water based coating and sufficient hydrophilic character to keep the water based coating composition dispersed in an aqueous medium. These adducts, however, tend to react with water to form urea reaction products which reduce the working life of the emulsifiable polyisocyanate. Moreover, exposure of these emulsifiable polyisocyanates to heat can form undesirable polyureas which greatly reduces the pot life of the emulsifiable polyisocyanate.

A need exists for more stable water emulsifiable polyisocyanates which are less likely to react with water to extend the working life of the emulsifiable polyisocyanates in water.

DISCLOSURE OF INVENTION

In a first aspect, the invention relates to polyisocyanate derived adducts. The adducts are the reaction products of a urethane prepolymer and a capping agent. The capping agent is any of methoxypolyoxyethylene monols, polyoxyethylene-polyoxypropylene monols, and mixtures thereof. The urethane prepolymer is the reaction product of a dihydroxy functional polyol and an isocyanate. The dihydroxy functional polyol is any of polyoxyethylene glycol and polyoxyethylene polyoxypropylene glycols. Preferably, the methoxypolyoxyethylene monols have a molecular weight of about 350 to about 750, and the polyoxyethylene-polyoxypropylene monols have a molecular weight of about 270 to about 3930. Preferably, the urethane prepolymer and the capping agent are present in a weight ratio of urethane prepolymer to capping agent of about 2:1 to about 1:2, the dihydroxy functional polyol and the isocyanate are present in a weight ratio of dihydroxy functional polyol to isocyanate of about 2:1 to about 25:1, and the capping agent and the urethane prepolymer are present in a weight ratio of the capping agent to the prepolymer of about 1:1 to about 1:3.

In another aspect, the invention relates to an emulsifiable polyisocyanate that includes an isocyanate and a polyisocyanate derived adduct.

In yet another aspect, the invention relates to an aqueous emulsion having greatly improved stability. The aqueous emulsion includes emulsifiable polyisocyanate. The emulsifiable polyisocyanate includes an isocyanate and a polyisocyanate derived adduct. The polyisocyanate derived adduct includes the reaction product of a urethane prepolymer and a capping agent. The capping agent may be any of methoxypolyoxyethylene monols, polyoxyethylene-polyoxypropylene monols, and mixtures thereof. The urethane prepolymer is the reaction product of a dihydroxy functional polyol and an isocyanate. The urethane prepolymer and the capping agent can be present in a weight ratio of urethane prepolymer to capping agent of about 2:1 to about 1:2, the dihydroxy functional polyol and the isocyanate can be present in a weight ratio of dihydroxy functional polyol to isocyanate of about 2:1 to about 25:1, and the capping agent and urethane prepolymer are present in a weight ratio of the capping agent to the prepolymer of about 1:1 to about 1:3.

In yet another aspect, the invention relates to an aqueous latex emulsion having greatly increased stability. The aqueous latex emulsion includes an emulsifiable isocyanate. The emulsifiable polyisocyanate may be any of a first reaction product of polymeric methane diphenyl diisocyante, methoxypolyoxyethylene monol, and a polyisocyanate derived adduct, the adduct comprising the reaction product of a urethane prepolymer and a methoxypolyoxyethylene monol, wherein the urethane prepolymer is the reaction product of a dihydroxy functional polyol and an isocyanate, a second reaction product of product of uretomine modified 4,4'-diphenylmethane diisocyanate having about 26% NCO, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate, and a third reaction product of uretonimine modified 4,4'-diphenylmethane diisocyanate having a NCO value of about 29.3%, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate.

Having summarized the invention, the invention is described in detail below by reference to the detailed description below and the following non-limiting examples.

MODES FOR CARRRYING OUT THE INVENTION

Glossary of Terms and Definitions:
1. Arcol PPG-725 is a polyoxypropylene glycol of the formula HO—$(CH_2CH_3CHO)_n$—H from Lyondell Chemical Company and has a molecular weight of 725.
2. Carbowax MPEG 350 is a methoxypolyoxyethylene monol of the formula $CH_3$—$(OCH_2CH_2)_n$—OH where n has an average number of 7. Carbowax 350 is available from Union Carbide Chemicals and Plastics and has a molecular weight of 350.
3. Carbowax 550 is a methoxypolyoxyethylene monol of the formula $CH_3$—$(OCH_2CH_2)_n$—OH where n has an average number of 12. Carbowax 550 is available from Union Carbide Chemicals and Plastics and has a molecular weight of 550.
4. Carbowax 750 is a methoxypolyoxyethylene monol of the formula $CH_3$—$(OCH_2CH_2)_n$—OH where n has an average number of 16. Carbowax 750 is available from Union Carbide Chemicals and Plastics and has a molecular weight of 750.
5. Carbowax 600 is a polyoxyethylene glycol of the formula H—$(OCH_2CH_2)_n$—OH where n is an average number of 13. Carbowax 600 is available from Union Carbide Chemicals and plastics and has a molecular weight of 600.

6. Castor oil is a trifunctional, low molecular weight fatty ester polyol that has a hydroxyl No. 164.
7. Ucon 50-HB-55 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-55 is available from Union Carbide Chemicals and plastics and has a molecular weight of 270.
8. Ucon 50-HB-100 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-100 is available from Union Carbide Chemicals and plastics and has a molecular weight of 520.
9. Ucon 50-HB-170 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-100 is available from Union Carbide Chemicals and plastics and has a molecular weight of 750.
10. Ucon 50-HB-260 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-260 is available from Union Carbide Chemicals and plastics and has a molecular weight of 970.
11. Ucon 50-HB-400 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-400 is available from Union Carbide Chemicals and plastics and has a molecular weight of 1230.
12. Ucon 50-HB-660 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-660 is available from Union Carbide Chemicals and plastics and has a molecular weight of 1590.
13. Ucon 50-HB-2000 is an alcohol started polyoxyethylene polyoxypropylene monol of the formula RO—$(CH_2CH_3CHO)_n$—$(CH_2CH_2O)_n$—H and has equal amounts by weight of oxyethyl and oxypropylene groups. Ucon 50-HB-2000 is available from Union Carbide Chemicals and plastics and has a molecular weight of 2660.
14. Ucon 50-HB-3520 is an alcohol started polyoxyethylene polyoxypropylene monol of the formula RO—$(CH_2CH_3CHO)_n$—$(CH_2CH_2O)_n$—H and has equal amounts by weight of oxyethlene and oxypropylene groups. Ucon 50-HB-3520 is available from Union Carbide Chemicals and plastics and has a molecular weight of 3380.
15. Ucon 50-HB-5100 is an alcohol started polyoxyethylene polyoxypropylene monol of the formula RO—$(CH_2CH_3CHO)_n$—$(CH_2CH_2O)_n$—H and has equal amounts by weight of oxyethylene and oxypropylene groups. Ucon 50-HB-5100 is available from Union Carbide Chemicals and plastics and has a molecular weight of 3930.
16. Ucon 75-H-450 is a polyoxyethylene-polyoxypropylene glycol of the formula HO—$(CH_2CH_3CHO)_m$—$(CH_2CH_2O)_n$—H and has 75 weight percent of oxyethylene and 25 weight percent oxypropylene groups. Ucon 75-H-450 is available from Union Carbide Chemicals and plastics and has a molecular weight of 980.
17. Ucon 75-H-1400 is a polyoxyethylene polyoxypropylene glycol of the formula HO—$(CH_2CH_3CHO)_n$—$(CH_2CH_2O)_n$—H and has 75 weight percent of oxyethylene and 25 weight percent oxypropylene groups. Ucon 75-H-1400 is available from Union Carbide Chemicals and plastics and has a molecular weight of 2500.
18. Rubinate 44 is 4,4'-diphenylmethane diisocyanate that has a % NCO value of 33.5 and a functionality of 2.0 from Huntsman Polyurethanes.
19. Rubinate 1670 is uretonimine modified 4,4'-diphenylmethane diisocyanate that has a % NCO value of 26 and a functionality of 2.05 from Huntsman Polyurethanes.
20. Rubinate 1680 is uretonimine modified 4,4'-diphenylmethane diisocyanate that has a % NCO value of 29.3 and a functionality of 2.1 from Huntsman Polyurethanes.
21. Rubinate 9236 is modified diphenylmethane diisocyanate based on Rubinate M that has a % NCO value of 30.1 and a functionality of 2.7 from Huntsman Polyurethanes.
22. Rubinate M is polymeric methane diphenyl diisocyante that has an isocyanate value of 31.5% and a functionality of 2.7 from Huntsman Polyurethanes.
23. Latex Dur-o-set E-250 is an ethylene vinyl acetate copolymer aqueous emulsion from National Starch and Chemical Company, Bridgewater, N.J. Dur-o-set E-250 has a solids content of 56%, a pH of 4.7, and a density of 4.7 lbs./gal.
24. Desmodur XO-672 is MDI prepolymer from Bayer Corp.

All molecular weights, unless otherwise specified, are number average.

MATERIALS

Isocyanates

Suitable isocyanates which may be employed in the invention for making the polyisocyanate derived adducts of the present invention include known aliphatic, cycloaliphatic, aromatic and heterocyclic polyisocyanates. Also suitable are polyisocyanates which contain carbodiimide groups, urethane groups, allophanate groups, isocyanurate groups, biuret groups, and urea groups.

Examples of aromatic isocyanates which may be employed include but are not limited to 2,4-hexahydrotoluene diisocyanate, 2,6-hexahydrotoluene diisocyanate, 1,3-phenylene diisocyanate, 1,4-phenylene diisocyanate, 2,4-toluene diisocyanate (TDI), 2,6-toluene diisocyanate, diphenyl methane-2,4'-diisocyanate(2,4'MDI), diphenyl methane-4,4'-diisocyanate (4,4'MDI), naphthalene-1,5-diisocyanate. triphenyl methane-4,4',4"-triisocyanate, polymethylene polyphenylene polyisocyanates and mixtures thereof.

Examples of aliphatic polyisocyanates which may be employed include but are not limited to ethylene diisocyanate, 1,4-tetramethylene diisocyanate, 1,6-hexamethylene diisocyanate (HDI), 2,4,4-tri-methyl-1,6-hexamethylene diisocyanate, and 1,12-dodecane diisocyanate.

Examples of cycloaliphatic polyisocyanates which may be employed include but are not limited to cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4'-dicyclohexylmethane diisocyanate, 4,4'-dicyclohexylmethane diisocyanate.

Preferred isocyanates include ethylene diisocyanate, 1,4-tetramethylene diisocyanate, 1,6-hexamethylene diisocyanate (HDI), 2,4,4-tri-methyl-1,6-hexamethylene diisocyanate, 1,12-dodecane diisocyanate, cyclobutane-1,3-diisocyanate, cyclohexane-1,3-diisocyanate, cyclohexane-1, 4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4-hexahydrotoluene diisocyanate, 2,6-hexahydrotoluene diisocyanate, 2,4'-dicyclohexylhexylmethane diisocyanate, 4,4'-dicyclohexylmethane diisocyanate, 1,3-phenylene diisocyanate, 1,4-phenylene diisocyanate, 2,4-toluene diisocyanate (TDI), 2,6-toluene diisocyanate, diphenyl methane-2,4'-diisocyanate, diphenyl methane-4,4''-diisocyanate (MDI), naphthalene-1,5-diisocyanate, triphenyl methane-4, 4',4''-triisocyanate, polymethylene polyphenylene polyisocyanates and mixtures thereof. A particularly preferred polyisocyanate for making the polyisocyanate derived adducts of the present invention is 4,4' diphenyl methane diisocyanate (4,4'MDI).

Hydroxy Functional Monols and Polyols

Hydroxy functional monols and polyols which may be employed in the invention include mono-hydroxy functional polyoxyethylene monols, dihydroxy functional polyoxyethylene glycols, mono-hydroxyfunctional polyoxyethylene-polyoxypropylene monol, and dihydroxy functional EO/PO glycols. Preferably, the mono-hydroxy functional polyoxyethylene monol and the monohydroxy functional EO/PO monols are those available under the tradenames Carbowax MPEG and UCON, respectively, from Union Carbide.

Carbowax MPEG mono-hydroxy functional polyoxyethylene monols have an all ethylene oxide (EO) backbone and a molecular weight of about 100 to about 5000. The Carbowax MPEGs used in the invention preferably have a molecular weight of from about 300 to about 800. The Ucon monohydroxy functional EO/PO glycols have a molecular weight of from about 270 to about 3930.

The dihydroxy functional polyoxyethylene glycols and the dihydroxy functional EO/PO glycols preferably are those available under the tradenames Carbowax PEG and Ucon, respectively, from Union Carbide. The Carbowax dihydroxy polyoxyethylene glycols employed in the invention have a molecular weight of about 500 to about 2500, preferably about 600 to about 800. The Ucon dihydroxy functional EO/PO glycols employed in the invention have a molecular weight of about 500 to about 5000, preferably about 980 to about 2500.

Preparation of Polyisocyanate Derived Adducts

The polyisocyanate derived adducts of the invention can be prepared by conventional polymerization techniques, either batch-wise by combining all of the ingredients, or step-wise. One or more of the aforementioned polyols are reacted with isocyanate to produce an adduct. The adduct can be made according to two different embodiments. The number average molecular weight of the polyisocyanate derived adducts of the invention are from about 600 to about 11000 as determined by gel permeation chromatography.

The first embodiment entails a single step procedure wherein a mono-hydroxy functional monol is reacted with a polyisocyanate to produce the adduct. The total amount of monol added is a stoichiometric equivalent or more with respect to the polyisocyanate. Preferably, the polyols are Carbowax MPEG and Ucon polyols, alone or in combination. The amount of polyol added is sufficient to consume about 99%, preferably 100% of the isocyanate functionality so as to not leave any isocyanate reactive functionality in the resulting polyisocyanate derived adduct.

The alchol(s) are added at a controlled rate to the polyisocyanate in order to maintain the reaction temperature between about 50° C. to about 100° C., preferably about 70° C. to about 80° C., most preferably below about 85° C. The total amount of monol added to the polyisocyanate is from about 0.95 of an equivalent per equivalent of polyisocyanate, preferably from about 0.99 to 1.03 of monol to polyisocyanate equivalent.

The reaction is monitored by isocyanate absorbance band by using a Fourier transform infrared spectrometer and isocyanate titration. The reaction end point is achieved when no isocyanate functionality remains in the resulting polyisocyanate derived adduct.

The second embodiment for manufacture of the polyisocyanate derived adducts of the invention entails a two step procedure. Step one entails reacting a di-hydroxy functional polyol with polyisocyanate to make a polyisocyanate terminated intermediate at a reaction temperature of about 70° C. to about 80° C. The amount of di-hydroxy functional polyol reacted with the polyisocyanate is less than one stoichiometric equivalent with respect to the polyisocyanate. The amount of polyol reacted with the polyisocyanate is preferably not less than about 0.85 of an equivalent per equivalent of isocyanate, more preferably from about 0.90 to 0.97 of polyol to isocyanate equivalent. In step two, a mono-hydroxy functional alchol is reacted with the polyisocyanate terminated intermediate made in the first step. The amount of mono-hydroxy functional monol employed is sufficient to consume about 99%, preferably 100% of the isocyanate functionality without leaving any of the remaining isocyanate reactive functionality in the resulting polyisocyanate derived adduct.

Reaction of the mono-hydroxy functional monol with the isocyanate terminated intermediate is monitored by isocyanate absorbance band by using a Fourier transform infrared spectrometer and isocyanate titration. The reaction end point is achieved when no isocyanate functionality remains in the resulting polyisocyanate derived adduct.

Although, in principle, it is intended that all of the isocyanate functionality of the polyisocyanate be reacted, it should be understood that 100 percent complete reaction cannot always be attained, and therefore, trace amounts of unreacted isocyanate and/or unreacted hydroxyls should not be considered as outside the scope of the invention. Alternatively, reacting "all" of the isocyanate for the purposes of the present invention may be defined as at least 99 percent complete reaction, preferably 100 percent.

The polyisocyanate derived adducts of the invention, through selection of the mono-hydroxy functional monol as taught herein below, can be tailored to have a desired hydrophilicity. Generally, these adducts are about 30%, preferably about 40%, most preferably about 100 percent soluble in water at room temperature.

The mono-hydroxy functional monol can be mono-hydroxy functional polyoxyethylene monol or mono-hydroxy functional polyoxyethylene/polyoxypropylene monol. The blend may have about 5 to 1 ratio by weight of polyisocyanate derived adduct to mono-hydroxy functional monol, preferably about 2.5 to 1 ratio by weight, most preferably about 1 to 1 ratio by weight.

Preparation of Emulsifiable Polyisocyanates from the Polyisocyanate Derived Adducts Emulsifiable polyisocyanates are prepared by blending and agitation of a polyisocyanate and a polyisocyanate derived adduct until a homogeneous solution of the polyisocyanate derived adduct in the isocyanate is attained. The solution of polyisocyanate derived adduct in isocyanate may have about 1 to about 25 percent by weight of the polyisocyanate derived adduct, preferably about 1 to about 15 percent, most preferably about 2 to about 10 percent, based on the combined weight of the adduct and free isocyanate, remainder polyisocyanate.

Preparation of Aqueous Emulsions of Emulsifiable Polyisocyanates Containing Polyisocyanate Derived Adducts Aqueous emulsions of emulsifiable polyisocyanates are prepared by blending the emulsifiable polyisocyanate containing derived adduct with water at a 1:1 ratio by weight under vigorous agitation until the isocyanate is visibly completely emulsified, as indicated by a uniformly cloudy liquid. The stability (potlife) of the resulting aqueous emulsion is measured by changes in viscosity of the liquid vs. time. Viscosities are measured every 30–60 minutes using a Brookfield viscometer. The potlife of the emulsion is defined as the time when the change in the difference between successive viscosity measurements is more than 100% compared to the immediately preceding viscosity measurement.

EXAMPLES

The invention is further illustrated by, but is not intended to be limited to, the following examples. All parts and percentages are by weight unless otherwise specified.

Examples 1–10 illustrate manufacture of emulsifiable polyisocyanates by one step procedure, manufacture of emulsifiable polyisocyanates, and aqueous emulsions of emulsifiable polyisocyanates.

Example 1

A round-bottom flask and a stir blade are preheated to 60° C. for further use. 26.31 g of Rubinate 44 is placed into the preheated round-bottom flask equipped with stir blade, stir bearing, stir shaft, nitrogen inlet, thermocouple, temperature controller, heating mantle, and a stopper to produce a reaction mixture. 73.69 g Carbowax MPEG 350 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate. The structure of the resulting polyisocyanate derived adduct is Carbowax MPEG 350 capped 4,4' MDI. The adduct has a number average molecular weight of 950 as determined by gel permeation chromatography. The viscosity of the resulting adduct is 340 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion at 25° C., as measured by a Brookfield viscometer at 50 hrs. after the aqueous isocyanate emulsion is made is less than 500 Centipoise.

Example 2

A round-bottom flask and a stir blade are preheated to 60° C. for further use. 18.52 g of Rubinate 44 is placed into the preheated round-bottom flask equipped with stir blade, stir bearing, stir shaft, nitrogen inlet, thermocouple, temperature controller, heating mantle, and a stopper. 81.48 g Carbowax MPEG 550 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate. The structure of the resulting polyisocyanate derived adduct is Carbowax MPEG 550 capped 4,4' MDI. The adduct has a number average molecular weight of 1350 as determined by gel permeation chromatography. The viscosity of the resulting adduct is 460 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion, when measured by a Brookfield viscometer, at 50 hours after forming the aqueous isocyanate emulsion is made, is less than 500 Centipoise (cps).

Example 3

A round-bottom flask and a stir blade are preheated to 60° C. for further use. 14.29 g of Rubinate 44 is placed into the preheated round-bottom flask equipped with stir blade, stir bearing, stir shaft, nitrogen inlet, thermocouple, temperature controller, heating mantle, and a stopper. 85.71 g Carbowax MPEG 750 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate. The structure of the resulting polyisocyanate derived adduct is Carbowax MPEG 750 capped 4,4' MDI. The adduct has a number average molecular weight of 1750 as determined by gel permeation chromatography. The viscosity of the resulting adduct is 800 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 50 hrs. after the aqueous isocyanate emulsion is made is less than 500 Centipoise.

Example 3-1

A round-bottom flask and a stir blade are preheated to 60° C. for further use. 23.92 g of Rubinate 44 is placed into the preheated round-bottom flask equipped with stir blade, stir bearing, stir shaft, nitrogen inlet, thermocouple, temperature controller, heating mantle, and a stopper to produce a reaction mixture. 76.08 g Carbowax MPEG 350 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate. The structure of the resulting polyisocyanate derived adduct is 4,4' MDI capped with excess Carbowax MPEG 350. The adduct has a number average molecular weight of 890 as determined by gel permeation chromatography. The viscosity of the resulting adduct is 310 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion at 25° C., as measured by a Brookfield viscometer at 50 hrs. after the aqueous isocyanate emulsion is made is less than 500 Centipoise.

Example 4

A round-bottom flask and a stir blade are preheated to 60° C. for further use. 19.38 g of Rubinate 44 is placed into the preheated round-bottom flask equipped with stir blade, stir bearing, stir shaft, nitrogen inlet, thermocouple, temperature controller, heating mantle, and a stopper. 80.62 g Ucon 50HB100 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate.

The structure of the resulting polyisocyanate derived adduct is Ucon 50HB100 capped 4,4' MDI. The adduct has a number average molecular weight of 1290 as determined by gel permeation chromatography. The viscosity of the adduct is 770 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 150 hrs. after the aqueous isocyanate emulsion is made is less than 500 Centipoise.

Example 5

A round-bottom flask and a stir blade are preheated to 60° C. for further use. 14.29 g of Rubinate 44 is placed into the preheated round-bottom flask equipped with stir blade, stir bearing, stir shaft, nitrogen inlet, thermocouple, temperature controller, heating mantle, and a stopper. 85.71 g Ucon 50HB170 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate.

The structure of the resulting polyisocyanate derived adduct is Ucon 50HB170 capped 4,4' MDI. The adduct has a number average molecular weight of 1750 as determined by gel permeation chromatography. The viscosity of the resulting adduct is 1075 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

An aqueous emulsion is made by blending the emulsifiable polyisocyanate with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 150 hrs. after the aqueous isocyanate emulsion is made is less than 500 Centipoise.

Example 6

A round-bottom flask and a stir blade are preheated to 60° C. for further use. 11.42 g of Rubinate 44 is placed into the preheated round-bottom flask equipped with stir blade, stir bearing, stir shaft, nitrogen inlet, thermocouple, temperature controller, heating mantle, and a stopper. 88.58 g Ucon 50HB260 at a temperature of 60° C. is added into the flask to produce a reaction mixture. The reaction temperature is increased from 60° C. to 75° C. over 60 minutes at the heating rate of 0.25° C./min., and the reaction mixture is allowed to react for 2–3 hours at 75° C. The reaction end, identified by infrared analysis, is indicated by no evidence of isocyanate.

The structure of the resulting polyisocyanate derived adduct is Ucon 50HB260 capped 4,4' MDI. The adduct has a number average molecular weight of 2190 as determined by gel permeation chromatography. The viscosity of the resulting adduct is 1125 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature. The emulsifiable polyisocyanate is blended with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 150 hrs. after the aqueous isocyanate emulsion is made is less than 500 Centipoise.

Example 7

A round-bottom flask and a stir blade are preheated to 60° C. for further use. 14.29 g of Rubinate 44, 38.07 g Carbowax MPEG 750 and 49.24 g Ucon50HB260, each at 60° C. are placed into the preheated round-bottom flask equipped with stir blade, stir bearing, stir shaft, nitrogen inlet, thermocouple, temperature controller, heating mantle, and a stopper. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate.

The structure of the resulting polyisocyanate derived adduct is Carbowax MPEG750/Ucon50HB260 capped 4,4' MDI. The adduct has a number average molecular weight of 1970 as determined by gel permeation chromatography. The viscosity of the resulting adduct is 560 centipoise at 50° C., as determined by a Brookfield viscometer.

The above-formed polyisocyanate derived adduct at a temperature of 50° C. is mixed with Rubinate M at a temperature of 50° .C at a 5/95 ratio by weight to produce an emulsifiable polyisocyanate as indicated by formation of a homogeneous solution after cooling to room temperature. The emulsifiable polyisocyanate is blended with water at 50/50 ratio by weight under vigorous agitation until the isocyanate is visibly completely emulsified in water, as indicated by a uniformly cloudy product. The viscosity of the aqueous isocyanate emulsion at 50° C., as measured by a Brookfield viscometer at 300 hrs. after the aqueous isocyanate emulsion is made is less than 500 Centipoise.

Example 8

A round-bottom flask and a stir blade are preheated to 60° C. for further use. 11.21 g of Rubinate 44, 33.63 g Carbowax MPEG 750 and 55.16 g Ucon50HB400, each at 60° C. are placed into the preheated round-bottom flask equipped with stir blade, stir bearing, stir shaft, nitrogen inlet, thermocouple, temperature controller, heating mantle, and a stopper to provide a reaction mixture. The reaction temperature is increased from 60° C. to 75° C. over 60 minutes at the heating rate of 0.25° C./min., and the reaction mixture is allowed to react for 2–3 hours at 75° C. to produce a polyisocyanate derived adduct. The reaction end, identified by infrared analysis, is indicated by no evidence of isocyanate.

The structure of the resulting polyisocyanate derived adduct is Carbowax MPEG750/Ucon50HB400 capped 4,4' MDI. The adduct has a number average molecular weight of 2230 as determined by gel permeation chromatography. The viscosity of the resulting adduct is 595 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature. The emulsifiable polyisocyanate is blended with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 300 hrs. after the aqueous isocyanate emulsion is made, is less than 500 Centipoise.

Example 9

A round-bottom flask and a stir blade are preheated to 60° C. for further use. 6.83 g of Rubinate 44, 20.49 g Carbowax MPEG 750 and 72.68 g Ucon50HB2000, each at 60° C. are placed into the preheated round-bottom flask equipped with stir blade, stir bearing, stir shaft, nitrogen inlet, thermocouple, temperature controller, heating mantle, and a stopper to provide a reaction mixture. The reaction temperature is increased from 60° C. to 75° C. over 60 minutes at the heating rate of 0.25° C/min., and the reaction mixture is allowed to react for 2–3hours at 75° C. to produce a polyisocyanate derived adduct. The reaction end, identified by infrared analysis, is indicated by no evidence of isocyanate.

The structure of the resulting polyisocyanate derived adduct is Carbowax MPEG750/Ucon50HB2000 capped 4,4' MDI. The adduct has a number average molecular weight of 3660 as determined by gel permeation chromatography. The viscosity of the resulting adduct is 850 centipoise at 50° C. as determined by a Brookfield viscometer.

The resulting polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

The emulsifiable polyisocyanate is blended with water at 50/50 ratio by weight under vigorous agitation until the isocyanate is visibly completely emulsified in water, as indicated by a uniformly cloudy product. The viscosity of the resulting aqueous isocyanate emulsion at 50° C., as measured by a Brookfield viscometer at 300 hrs. after the aqueous isocyanate emulsion is made is less than 500 Centipoise.

Example 10

A round-bottom flask and a stir blade are preheated to 60° C. for further use. 5.71 g of Rubinate 44, 17.13 g Carbowax MPEG 750 and 77.17 g Ucon50HB3520 are placed into the preheated round-bottom flask equipped with stir blade, stir bearing, stir shaft, nitrogen inlet, thermocouple, temperature controller, heating mantle, and a stopper to provide a reaction mixture. The reaction temperature is increased from 60° C. to 75° C. over 60 minutes at the heating rate of 0.25° C/min., and the reaction mixture is allowed to react for 2–3 hours at 75° C. to produce a polyisocyanate derived adduct. The reaction end, identified by infrared analysis, is indicated by no evidence of isocyanate.

The structure of the resulting polyisocyanate derived adduct is Carbowax MPEG750/Ucon50HB3520 capped 4,4' MDI. The adduct has a number average molecular weight of 4380 as determined by gel permeation chromatography. The viscosity of the resulting adduct is 2950 centipoise at 50° C. as determined by a Brookfield viscometer.

The above-formed polyisocyanate derived adduct at a temperature of 50° C. is mixed with Rubinate M at a temperature of 50° C. at a 5/95 ratio by weight to produce an emulsifiable polyisocyanate as indicated by formation of a homogeneous solution after cooling to room temperature.

The emulsifiable polyisocyanate is blended with water at 50/50 ratio by weight under vigorous agitation until the isocyanate is visibly completely emulsified in water, as indicated by a uniformly cloudy product. The viscosity of the resulting aqueous isocyanate emulsion at 50° C, as measured by a Brookfield viscometer at 300 hrs. after the aqueous isocyanate emulsion is made is less than 500 Centipoise.

Examples 11–20 below illustrate manufacture of a polyisocyanate derived adduct by a two step procedure which entails forming an isocyanate terminated intermediate and reacting the intermediate with any of methoxypolyoxyethylene monol, polyoxyethylene-polyoxypropylene monol, and mixtures thereof. The NCO content in the intermediate is determined in accordance with ASTM D-5155-91. These examples also illustrate manufacture of emulsifiable polyisocyanates, and emulsions of these emulsifiable polyisocyanates.

Example 11

Carbowax 600, a round-bottom flask and a stir blade are each preheated to 60° C. for further use. 45.48 g Rubinate 44 is placed into the preheated round-bottom flask equipped with stir blade, stir bearing, stir shaft, nitrogen inlet, thermocouple, temperature controller, heating mantle, and a stopper, and is heated to 60° C. 54.52 g of the preheated Carbowax 600 at 60° C., i.e., 0.5 equivalent per equivalent of isocyanate, is placed into an addition funnel and is added to the flask over a period of one hour to provide a reaction mixture. The reaction temperature is increased from 60° C. to 75° C. over 60 minutes and the reaction mixture is allowed to react for 3–4 hours to produce an isocyanate terminated intermediate. The end of the reaction is adjudged to occur when the % NCO content of the isocyanate terminated intermediate is between 7.46–7.65% as determined by NCO titration based on ASTM D-5155.

100.16 g Carbowax MPEG550 at a temperature of 60° C. is quickly added into the flask to react with the above isocyanate terminated intermediate for 4 hours at 75° C. to produce a polyisocyanate derived adduct. The reaction end is identified by infrared analysis which shows no evidence of isocyanate. The resulting polyisocyanate derived adduct has a number average molecular weight of 2200 as determined by gel permeation chromatography, and the viscosity is 4000 centipoise (cps) at 50° C. as determined by using Brookfield viscometer. The structure of the polyisocyanate derived adduct is Carbowax MPEG550 capped isocyanate terminated intermediate based on Carbowax PEG600 and Rubinate 44.

An emulsifiable polyisocyanate is produced by blending the above formed polyisocyanate derived adduct at a temperature of 50° C. with Rubinate M at a temperature of 50° C. at 5/95 ratio by weight until a homogeneous liquid is formed after cooling to room temperature.

An aqueous emulsion of the emulsifiable polyisocyanate is formed by blending the emulsifiable polyisocyanate with water at 50:50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the aqueous isocyanate emulsion is formed.

Example 12

The procedure of example 11 is used to produce an isocyanate terminated intermediate.

136.36 g Carbowax MPEG750 at a temperature of 60° C. is quickly added into the flask to react with the isocyanate terminated intermediate for 4 hours at 75° C. The reaction end is identified by infrared analysis which shows no evidence of isocyanate. The resulting polyisocyanate derived adduct has a number average molecular weight of 2600 as determined by gel permeation chromatography and a viscosity of 5000 centipoise (cps) at 50° C. as determined by using a Brookfield viscometer. The structure of the polyisocyanate derived adduct is Carbowax MPEG750 capped isocyanate terminated intermediate based on Carbowax PEG600 and Rubinate 44.

An emulsifiable polyisocyanate is produced by blending the above formed polyisocyanate derived adduct at a temperature of 50° C. with Rubinate M at a temperature of 50° C. at 5/95 ratio by weight until a homogeneous solution is formed after cooling to room temperature.

An aqueous emulsion of the emulsifiable polyisocyanate is formed by blending the emulsifiable polyisocyanate with water at 50:50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the aqueous isocyanate emulsion is formed.

Example 13

The procedure of example 11 is followed except that 66.23 g Ucon 75H450 is substituted for the Carbowax 600 used in Example 11. 66.23 g of Ucon 75H450, i.e. 0.5 equivalent per equivalent of isocyanate, at a temperature of 60° C. is placed into the addition funnel and added into the preheated flask with 33.77 g of Rubinate 44 at a temperature of 60° C. over 1 hour. The reaction temperature is increased from 60° C. to 75° C. over 60 minutes and the mixture is allowed to react for 6–8 hours to produce a polyisocyanate derived adduct. The end of the reaction is adjudged to occur when the % NCO content of the resulting isocyanate terminated intermediate is between 5.53–5.67% as determined by NCO titration.

74.25 g Carbowax MPEG550 at a temperature of 60° C. is quickly added into the flask to react with the above formed isocyanate terminated intermediate for 4 hours at 75° C. to produce a polyisocyanate derived adduct. The reaction end is identified by infrared analysis which shows no evidence of isocyanate. The above-formed polyisocyanate derived adduct has a number average molecular weight of 2580 as determined by gel permeation chromatography and a viscosity of 3050 centipoise at 50° C. as determined by using Brookfield viscometer. The structure of the polyisocyanate derived adduct is Carbowax MPEG550 capped isocyanate terminated intermediate based on Ucon 75H450 and Rubinate 44.

An emulsifiable polyisocyanate is formed by blending the above-formed polyisocyanate derived adduct at a temperature of 50° C. with Rubinate M at a temperature of 50° C. at 5/95 ratio by weight until a homogeneous solution is reached after cooling to room temperature.

An emulsion of the above formed emulsifiable polyisocyanate is formed by blending the emulsifiable polyisocyanate with water at 50/50 ratio by weight under vigorous agitation until the isocyanate is visibly completely emulsified in water as indicated by a uniformly cloudy liquid.

The viscosity of the aqueous isocyanate emulsion is less than 500 centipoise at 300 hours after the aqueous isocyanate emulsion is made.

Example 14

The procedure of example 13 is used to produce an isocyanate terminated intermediate.

101.26 g Carbowax MPEG750 at a temperature of 60° C. is quickly added into the flask to react with the above isocyanate terminated intermediate at a temperature of 75° C. for 4 hours to produce a polyisocyanate derived adduct. The reaction end is identified by infrared analysis which shows no evidence of isocyanate. The above-formed polyisocyanate derived adduct has a number average molecular weight of 3000 as determined by gel permeation chromatography and a viscosity of 6000 centipoise at 50° C. as determined by using a Brookfield viscometer. The structure of the polyisocyanate derived adduct is Carbowax MPEG750 capped isocyanate terminated intermediate based on Ucon 75H450and Rubinate 44.

An emulsifiable polyisocyanate is formed by blending the above-formed polyisocyanate derived adduct at a temperature of 50° C. with Rubinate M at a temperature of 50° C. at 5/95 ratio by weight until a homogeneous solution is reached after cooling to room temperature.

An emulsion of the above formed emulsifiable polyisocyanate is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the emulsion is made.

Example 15

The procedure of example 13 is used to produce an isocyanate terminated intermediate.

A mixture of 50.63 g Carbowax MPEG750 and 50.63 g of Ucon 50HB170 at a temperature of 60° C. is quickly added into the flask to react with the above isocyanate terminated intermediate for 4 hours to produce a polyisocyanate derived adduct. The reaction end is identified by infrared analysis which shows no evidence of isocyanate. The above-formed polyisocyanate derived adduct has a number average molecular weight of 2980 as determined by gel permeation chromatography and a viscosity of 4400 centipoise at 50° C. as determined by using a Brookfield viscometer. The structure of the polyisocyanate derived adduct is Carbowax MPEG750/Ucon 50HB170 capped isocyanate terminated intermediate based on Ucon 75H450 and Rubinate 44.

An emulsifiable polyisocyanate is formed by blending the above-formed polyisocyanate derived adduct at a temperature of 50° C. with Rubinate M at a temperature of 50° C. at 5/95 ratio by weight until a homogeneous solution is reached after cooling to room temperature. An aqueous emulsion of the above formed emulsifiable polyisocyanate is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the emulsion is made.

Example 16

The procedure of example 13 is used to produce an isocyanate terminated intermediate.

A mixture of 50.64 g Carbowax MPEG750 and 65.49 g of Ucon 50HB260 at a temperature of 60° C. is quickly added into the flask to react with the above isocyanate terminated intermediate at 75° C. for 4 hours to produce a polyisocyanate derived adduct. The reaction end is identified by infrared analysis which shows no evidence of isocyanate. The above-formed polyisocyanate derived adduct has a number average molecular weight of 3200 as determined by gel permeation chromatography and a viscosity of 5000 centipoise at 50° C. as determined by using a Brookfield viscometer. The structure of the polyisocyanate derived adduct is Carbowax MPEG750/Ucon 50HB260 capped isocyanate terminated intermediate based on Ucon 75H450 and Rubinate 44.

An emulsifiable polyisocyanate is formed by blending the above-formed polyisocyanate derived adduct at a temperature of 50° C. with Rubinate M at a temperature of 50° C. at 5/95 ratio by weight until a homogeneous solution is reached after cooling to room temperature.

An aqueous emulsion of the above formed emulsifiable polyisocyanate is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the emulsion is made.

Example 17

The procedure of example 13 is used to produce an isocyanate terminated intermediate.

130.95 g Ucon 50HB260 at 60° C. quickly added into the flask to react with the above isocyanate terminated intermediate for 4 hours at 75° C. to produce a polyisocyanate derived adduct. The reaction end is identified by infrared analysis which shows no evidence of isocyanate. The above-formed polyisocyanate derived adduct has a number average molecular weight of 3420 as determined by gel permeation chromatography and a viscosity of 5700 centipoise at 50° C. as determined by using a Brookfield viscometer. The structure of the polyisocyanate derived adduct is Ucon 50HB260 capped isocyanate terminated intermediate based on Ucon 75H450 and Rubinate 44.

An emulsifiable polyisocyanate is formed by blending the above-formed polyisocyanate derived adduct at a temperature of 50° C. with Rubinate M at a temperature of 50° C. at 5/95 ratio by weight until a homogeneous solution is reached after cooling to room temperature.

An aqueous emulsion of the above formed emulsifiable polyisocyanate is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the isocyanate/water emulsion is made.

Example 18

An isocyanate terminated intermediate is formed in a flask as in example 11 except that 83.33 g Ucon 75H1400, i.e., 0.5 equivalent per equivalent of isocyanate, is substituted for the 54.52 g Carbowax 600. The Ucon 75H1400 at a temperature of 60° C. is placed into the addition funnel and is added into the flask with 16.67 g of Rubinate 44 at a temperature of 60° C. over 1 hour. The reaction temperature is increased from 60° C. to 75° C. over 60 minutes and the mixture is allowed to react for 6–8 hours to produce an isocyanate terminated intermediate. The end of the reaction is adjudged to occur when the % NCO content of the resulting isocyanate terminated intermediate is between 2.73–2.80% as determined by NCO titration.

50.00 g Carbowax MPEG750 at 60° C. is quickly added into the flask to react with the above isocyanate terminated intermediate at 75° C. for 4 hours to produce a polyisocyanate derived adduct. The reaction end is identified by infrared analysis which shows no evidence of isocyanate. The polyisocyanate derived adduct has a number average molecular weight of 4500 as determined by gel permeation chromatography and a viscosity of 55000 centipoise at 50° C. as determined by using a Brookfield viscometer. The structure of the polyisocyanate derived adduct is Carbowax MPEG750 capped isocyanate terminated intermediate based on Ucon 75H1400 and Rubinate 44.

An emulsifiable polyisocyanate is formed by mixing the polyisocyanate derived adduct at 50° C. with Rubinate M at a temperature of 50° C. at 5/95 ratio by weight until the homogeneous solution is reached after cooling to room temperature.

An aqueous emulsion is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the isocyanate/water emulsion is made.

Example 19

An isocyanate terminated intermediate is formed in a flask as in example 18.

A mixture of 25.00 g Carbowax MPEG750 and 25.00 g of Ucon 50HB170 at a temperature of 60° C. is quickly added into the flask to react with the above-formed isocyanate terminated intermediate at 75° C. for 4 hours to produce a polyisocyanate derived adduct. The reaction end is identified by infrared analysis which shows no evidence of isocyanate. The polyisocyanate derived adduct has a number average molecular weight of 4500 as determined by gel permeation chromatography and a viscosity of 60000 centipoise at 50° C. as determined by using a Brookfield viscometer. The structure of the polyisocyanate derived adduct is Carbowax MPEG750/Ucon 50HB170 capped isocyanate terminated intermediate based on Ucon 75H1400 and Rubinate 44.

An emulsifiable polyisocyanate is formed by mixing the polyisocyanate derived adduct at a temperature of 50° C. with Rubinate M at a temperature of 50° C. at 5/95 ratio by weight until a homogeneous liquid is reached after cooling to room temperature.

An aqueous emulsion is formed by blending the emulsifiable polyisocyanate with water at 50/50 ratio by weight under vigorous agitation until the isocyanate is visibly completely emulsified in water as indicated by a uniformly cloudy liquid. The viscosity of the aqueous isocyanate emulsion is less than 500 centipoise at 300 hours after the emulsion is made.

Example 20

An isocyanate terminated intermediate is formed in a flask as in example 18.

258.94 g Ucon 50HB5100 at a temperature of 60° C. is quickly added into the flask to react with the above-formed isocyanate terminated intermediate at 75° C. for 4 hours to produce a polyisocyanate derived adduct. The reaction end is identified by infrared analysis which shows no evidence of isocyanate. The polyisocyanate derived adduct has a number average molecular weight of 11000 as determined by gel permeation chromatography and a viscosity of 100000 centipoise at 50° C. as determined by using a Brookfield viscometer. The structure of the polyisocyanate derived adduct is Ucon 75HB5100 capped isocyanate terminated intermediate based on Ucon 75H1400 and Rubinate 44.

An emulsifiable polyisocyanate is formed by mixing the polyisocyanate derived adduct at a temperature of 50° C. with Rubinate M at a temperature of 50° C. at 5/95 ratio by weight until a homogeneous liquid is reached after cooling to room temperature.

An aqueous emulsion is formed by blending the emulsifiable polyisocyanate with water at 50/50 ratio by weight under vigorous agitation until the isocyanate is visibly completely emulsified in water as indicated by a uniformly cloudy liquid.

The viscosity of the aqueous isocyanate emulsion is less than 500 centipoise at 300 hours after the isocyanate/water emulsion is made.

The polyisocyanate derived adducts of the invention may be produced in a wide range of molecular weights of about 1000 to about 13,000. These adducts can be blended with isocyanates to produce emulsifiable polyisocyanates which can be blended with water to make highly stable aqueous polyisocyanate emulsions. Aqueous polyisocyanate emulsions which include these adducts typically are stable for at least 48 hours before viscosity of the emulsion begins to increase.

The emulsifiable polyisocyanates which include the polyisocyanate derived adducts of the invention may be used in a variety of applications such as moisture resistant coatings on concrete and as cross linkers for latex compositions. Latex compositions which include the emulsifiable polyisocyanate of the invention can be used as wood-to-wood adhesives.

Examples 21–23 illustrate the use of the emulsifiable polyisocyanates of the invention as a crosslinker in Latex compositions.

Example 21

A round-bottom flask and stir blade are preheated to 50° .C for further use. 92 g of Rubinate M isocyanate at 50° C. is placed into the preheated round-bottle flask equipped with stir blade, stir bearing, stir shaft, nitrogen inlet, thermocouple, temperature controller, heating mantle, and a stopper. A mixture of 4 g Carbowax MPEG750 and 4 g polyisocyanate derived adduct from Example 1 at a temperature of 50° C. is added into the flask through an addition funnel over a period of 30 minutes for reaction with the isocyanate. The reaction is continued for 1–2 hours at 50° C. The resulting emulsified polyisocyanate is hereinafter referred to as R 9478. R9478 therefore is the reaction product of 92% Rubinate M, 4% Carbowax MPEG350, and 4% of the adduct produced in accordance with Example 1.

R 9478 emulsified polyisocyanate is mixed with Dur-o-set E-250 latex at 5/95 ratio by weight to achieve a homogeneous liquid. Thin films of the liquid are made by applying the liquid onto a glass plate and using a Gardner knife to draw down a thin film to a uniform thickness of 0.015–0.020 inches. The results of use of R 9478 emulsified polyisocyanate as a crosslinker for latex is illustrated in Table 1.

Example 22

A round-bottom flask and stir blade are preheated to 50° C. for further use. 90 g of Rubinate 1670 at a temperature of 50° C. is placed into the preheated round-bottom flask equipped with stir blade, stir bearing, stir shaft, nitrogen inlet, thermocouple, temperature controller, heating mantle, and a stopper. A mixture of 6 g Carbowax MPEG350 and 4 g polyisocyanate derived adduct from Example 1 at a temperature of 50° C. is added into the flask through an addition funnel over a period of 30 minutes for reaction with the isocyanate. The reaction is continued for 1–2 hours at 50° C. The resulting emulsified polyisocyanate is hereinafter referred to as R 9472.

R 9472 emulsified polyisocyanate is mixed with Dur-o-set E-250 latex at 5/95 ratio by weight to produce a homogeneous liquid. Thin films of the liquid are made by applying the liquid onto a glass plate and using a Gardner knife to draw down a thin film to a uniform thickness of 0.015–0.020 inches. Use of R 9472 emulsified polyisocyanate as a crosslinker for latex is illustrated in Table 1.

Example 23

A round bottom flask and stir blade are preheated to 50° C. for further use. 92 g of Rubinate 1680 at a temperature of 50° C. is placed into the preheated round-bottle flask Example 24

Rubinate 9236 is mixed with Duroset E-250 latex at a 5/95 ratio by to produce a homogenous liquid. Thin films of the liquid are made by applying the liquid onto a glass plate and using a Gardner knife to draw down the liquid to produce a thin film having a uniform thickness of 0.015–0.020 inches. The use of Rubinate 9236 as a crosslinker for latex is shown in Table 1.

TABLE 1

| | | | | | | | | | | |
|---|---|---|---|---|---|---|---|---|---|---|
| | | | | Latex film Properties | | | | | | |
| Cross-linker | AMT in latex[4] | Potlife[6] | Tensile Strength | Elong. | Die C Tear | Tensile Strength[1] | Elong.[1] | Tensile Strength | Elong.[2] | Adhesion Strength[3] |
| R 9478 | 5% | >24 HRS. | 510 PSI | 550% | 105 pli | 350 PSI | 610% | 140 PSI[2] | 10% | 190 lb/in |
| R 9478 | 10 | >24 | 640 | 360 | 175 | 530 | 210 | 270 | 25 | 290 |
| R 9478 | 15 | >24 | 1020 | 150 | 200 | 730 | 200 | 530 | 50 | 385 |
| R 9478 | 20 | >24 | 1400 | 110 | 225 | 890 | 70 | 580 | 65 | 560 |
| R 9236[7] | 5 | 4.0 | 400 | 450 | 90 | 170 | 510 | 10 | 8 | 130 |
| R 9236[7] | 10 | 2.5 | 510 | 250 | 140 | 300 | 200 | 80 | 20 | 250 |
| R 9236[7] | 15 | 1.5 | 850 | 120 | 165 | 470 | 100 | 150 | 35 | 320 |
| R 9236[7] | 20 | 1.0 | 1050 | 50 | 190 | 670 | 40 | 280 | 40 | 450 |
| XO-672 | 10 | 1.5 | 440 | 520 | 95 | 210 | 160 | 15 | 15 | — |
| XO-672 | 15 | 0.58 | 460 | 280 | 120 | 310 | — | — | — | — |
| XO-672 | 20 | 0.06 | — | — | — | — | — | — | — | — |
| R 9472 | 5 | 2.0 | 320 | 390 | 105 | 210 | 390 | 20 | 50 | 185 |
| R 9472 | 10 | 1.5 | 550 | 290 | 180 | 380 | 290 | 60 | 65 | 330 |
| R 9472 | 15 | 1.0 | 610 | 260 | 250 | 560 | 170 | 200 | 90 | 430 |
| R 9472 | 20 | 0.5 | 700 | 130 | 285 | 980 | 80 | 500 | 110 | 540 |
| R 9473 | 5 | >24 | 470 | 450 | 125 | 310 | 540 | 30 | 60 | 140 |
| R 9473 | 10 | 3.0 | 720 | 370 | 205 | 320 | 340 | 70 | 85 | 285 |
| R 9473 | 15 | 2.0 | 2.0 | 230 | 260 | 480 | 160 | 250 | 110 | 400 |
| R 9473 | 20 | 1.5 | 850 | 160 | 300 | 1260 | 90 | 560 | 145 | 480 |

[1]After immersion in water for 7 days, EVA Latex Duroset E-250
[2]After Immersion in Toluene for 7 days, EVA Latex Duroset E-250
[3]Wood to wood Adhesion, EVA Latex Duroset E-250
[4]EVA Latex Duroset E-250
[5]XO-672 is Desmodur XO-672
[6]Potlife of treated Latex
[7]Rubinate 9236 equipped with stir blade, stir bearing, stir shaft, nitrogen inlet, thermocouple, temperature controller, heating mantle, and a stopper. A mixture of 4 g Carbowax MPEG750 and 4 g polyisocyanate derived adduct from Example 1 at a temperature of 50° .C is added into the flask through an addition funnel over a period of 30 minutes for reaction with the isocyanate. The reaction is continued for 1–2 hours at 50° C. The resulting emulsified polyisocyanate is hereinafter referred to as R 9473.

The R 9473 emulsified polyisocyanate is mixed with Duroset E-250 latex at 5/95 ratio by weight to produce a homogeneous liquid. Thin films of the liquid are made by applying the liquid onto a glass plate and using a Gardner knife to draw down a thin film to a uniform thickness of 0.015–0.020 inches. The use of R 9473 emulsified polyisocyanate as a crosslinker for latex is illustrated in Table 1.

In table 1, the potlife of the treated latex is measured by changes in viscosity of the treated latex vs. time. Viscosities are measured every 30–60 minutes using a Brookfield viscometer. The potlife of the emulsion is defined as the time when the change in the difference between successive viscosity measurements is more than 100% compared to the immediately preceding viscosity measurement.

As shown in Table 1, R 9478, when employed in latex, produces crosslinked latex films which have improved tensile strength, improved elongation and improved tear strength. In addition, the pot life for R 9478 is greater than 24 hours in ethylene vinyl acetate ("EVA") latex. Advantageously, the pot life of R 9478 does not depend on the amount of R 9478 in the ethylene vinyl acetate latex.

Concrete Coatings

Aqueous emulsions which employ emulsifiable polyisocyanates which employ the polyisocyanate derived adducts of the invention advantageously can be used to coat concrete. These emulsions can be used as primers for concrete to provide excellent adhesion to subsequently applied epoxy and aliphatic isocyanate top coats.

The emulsifiable polyisocyanates also can be employed with castor oil to produce emulsions for coating concrete. Other oils which may be employed with the emulsifiable polyisocyanates to produce emulsions for coating concrete include fatty acid oils which have two or more hydroxyl groups.

The emulsifiable polyisocyanates of the invention advantageously reduce water penetration into the concrete and enable reduced moisture vapor transmission from the concrete. A preferred composition for use as a concrete primer is R 9468 that includes 93% Rubinate M, 3% of the polyisocyanate derived adduct made in accordance with example 13 above, 1.5% Arcol PPG-725 and 2.5% Carbowax MPEG 750.

Aqueous emulsions of emulsifiable polyisocyanates which employ polyisocyanate derived adducts of the invention have numerous advantages. For example, R 9468 has extended pot life in water. The viscosity of R9468 in water at a ratio of 50/50 by weight does not show any significant increase for several weeks, and the aqueous emulsion of emulsifiable polyisocyanate is less than 500 centipoise after 150 hours.

To illustrate the effectiveness of R 9468 as a coating for concrete, an aqueous emulsion of R 9468 emulsifiable polyisocyanate and water at a 50/50 weight ratio of R9468:water is formed by blending. The emulsion is applied onto a concrete surface and a Gardner knife is used to draw down the deposited emulsion to produce a coating of 0.005 inch thickness. After the coating of R 9468/water dries, the concrete is immersed into water to measure water absorption. The procedures for measurement of water absorption and moisture vapor permeability are described below:

Water Absorption Test

All sides of two 150 by 150 by 50 mm cured concrete slabs are lightly sandblasted to remove any residual oil from the surface. The slabs are then dried in an oven at 110±5 C to achieve a constant mass. This is followed by cooling to room temperature and application of the isocyanate emulsion of the invention to all sides of each of each of the slabs. After storage of the two slabs at ambient conditions for 14 days, the slabs are weighed and then immersed in water for 48 hours. The slabs are then removed from the water, surface dried with an absorbent cloth and then weighed. The % water absorption is calculated from the following formula:

Absorption,%=((C−B)/A)×100

Where

A=mass of the dry slab without the coating of polyisocyanate emulsion

B=mass of the dry slab with the emulsified isocyanate coating

C=mass of the slab after immersion in water

Moisture Vapor Permeability Test

Concrete slabs treated with the isocyanate emulsion of the invention also are evaluated for moisture vapor permeability according to the following procedure:

All sides of two 250×150×150 mm cured concrete slabs are lightly sandblasted and dried in an oven at 110±5° C. to achieve a constant mass. After cooling the slabs to room temperature, the slabs are immersed in distilled water for 48 hours, removed from the water, and then surface dried with an absorbent cloth. This is followed by application of the polyisocyanate emulsion of the invention to all sides of the slab. The treated slabs are stored for 14 days at ambient conditions and then placed into an oven at 110±5° C. until they reach a constant mass. The moisture vapor permeability is calculated from the following formula:

Moisture vapor permeability (%)=((C−D)/(B−A))×100

Where

A=mass of sand blasted and dried slab

B=mass of the saturated surface dried slab

C=B+mass of the Isocyanate's emulsion solids content applied to the slab

D=mass of treated slab after oven drying.

The emulsifiable polyisocyanates of the invention, preferably R 9468, as mentioned above, can be employed with castor oil in weight ratios of about 1:10 to about 10:1, preferably about 1:1, for use as a coating for concrete. Castor oil is the preferred oil for use with solutions of polyisocyanate and polyisocyanate derived adducts of the invention. Other oils which may be employed with the emulsifiable polyisocyanates include fatty acid oils which have two or more hydroxyl groups.

To illustrate the effectiveness of R 9468:Castor oil emulsion as a coating for concrete, an emulsion of R 9468:castor oil at a ratio of 1:1 R9468:Castor oil is applied to the concrete, and a Gardner knife is used to draw down the emulsion to 0.005 inch thickness on the concrete surface. The coated concrete is evaluated as above. The results for % water absorption and % moisture vapor permeability are shown in Tables 3 and 3A. In Table 3 and 3A, R9259 is the reaction product of 97% Rubinate M, 1.5% Carbowax MPEG 350 and 1.5% Carbowax MPEG 550. R9259 is made following the procedure of Example 21 except that 97 g Rubinate M and a mixture of 1.5 g Carbowax MPEG 350 and 1.5 Carbowax MPEG 550 is substituted for the mixture of 4 g Carbowax MPEG 750 and 4 g of the Polyisocyanate adduct of Example 1.

TABLE 3

Water Absorption

| Ex. | Time | Emulsifiable Isocyanate | Emulsifiable Isocyanate: Water Ratio | Emulsifiable Isocyanate: Castor Oil Ratio | Water Absorption |
|---|---|---|---|---|---|
| 24 | 2 Days | R 9259 | 1:1 | — | 1.7% |
| 25 | 8 | R 9259 | 1:1 | — | 2.5 |
| 26 | 22 | R 9259 | 1:1 | — | 2.7 |
| 27 | 28 | R 9259 | 1:1 | — | 2.75 |
| 28 | 32 | R 9259 | 1:1 | — | 2.79 |
| 29 | 2 | R 9468 | 1:1 | — | 0.9 |
| 30 | 8 | R 9468 | 1:1 | — | 1.3 |
| 31 | 22 | R 9468 | 1:1 | — | 1.8 |
| 32 | 28 | R 9468 | 1:1 | — | 1.85 |
| 33 | 32 | R 9468 | 1:1 | — | 1.89 |
| 34 | 2 | R 9259 | — | 1:1 | 0.21 |
| 35 | 8 | R 9259 | — | 1:1 | 0.37 |
| 36 | 22 | R 9259 | — | 1:1 | 0.38 |
| 37 | 28 | R 9259 | — | 1:1 | 0.40 |
| 38 | 32 | R 9259 | — | 1:1 | 0.41 |
| 39 | 2 | R 9468 | — | 1:1 | 0.03 |
| 40 | 8 | R 9468 | — | 1:1 | 0.06 |
| 41 | 22 | R 9468 | — | 1:1 | 0.08 |
| 42 | 28 | R 9468 | — | 1:1 | 0.09 |
| 43 | 32 | R 9468 | — | 1:1 | 0.09 |

TABLE 3A

Moisture Vapor Transmission

| Ex. | Time | Emulsifiable Isocyanate | Emulsifiable Isocyanate: Water Ratio | Emulsifiable Isocyanate: Castor Oil Ratio | Moisture Vapor Transmission |
|---|---|---|---|---|---|
| 44 | 10 Days | R 9259 | 1:1 | — | 7.3 g/m$^2$-24 Hr |
| 45 | 16 | R 9259 | 1:1 | — | 12.2 |
| 46 | 30 | R 9259 | 1:1 | — | 23.7 |
| 47 | 32 | R 9259 | 1:1 | — | 23.9 |
| 48 | 10 | R 9468 | 1:1 | — | 13.7 |
| 49 | 16 | R 9468 | 1:1 | — | 20.8 |
| 50 | 30 | R 9468 | 1:1 | — | 24.7 |
| 51 | 32 | R 9468 | 1:1 | — | 24.9 |
| 52 | 10 | R 9259 | — | 1:1 | 6.2 |
| 53 | 16 | R 9259 | — | 1:1 | 9.2 |
| 54 | 30 | R 9259 | — | 1:1 | 18.8 |
| 55 | 32 | R 9259 | — | 1:1 | 18.9 |

TABLE 3A-continued

Moisture Vapor Transmission

| Ex. | Time | Emulsifiable Isocyanate | Emulsifiable Isocyanate: Water Ratio | Emulsifiable Isocyanate: Castor Oil Ratio | Moisture Vapor Transmission |
|---|---|---|---|---|---|
| 56 | 10 | R 9468 | — | 1:1 | 6.6 |
| 57 | 16 | R 9468 | — | 1:1 | 9.6 |
| 58 | 30 | R 9468 | — | 1:1 | 18.6 |
| 59 | 32 | R 9468 | — | 1:1 | 18.8 |

The results in Tables 3 and 3A show that both aqueous and castor oil emulsions which employ emulsified polyisocyanates and the polyisocyanate derived adducts of the invention are highly effective at sealing concrete against moisture penetration as well as providing reduced moisture vapor permeability for concrete. The results in Table 3, 3A also show the ability of R9468 in both aqueous and castor oil emulsions to reduce water absorption and to reduce moisture vapor transmission.

What is claimed is:

1. A polyisocyanate derived adduct comprising
the reaction product of a urethane prepolymer and a capping agent,
the capping agent selected from the group consisting of a methoxypolyoxyethylene monols, polyoxyethylene-polyoxypropylene monols, and mixtures thereof, and
wherein the urethane prepolymer is the reaction product of a dihydroxy functional polyol and 4,4'-diphenyl methane diisocyanate.

2. The polyisocyanate derived adduct of claim 1 wherein the dihydroxy functional polyol is selected from the group consisting of polyoxyethylene glycol and polyoxyethylene polyoxypropylene glycols.

3. The polyisocyanate derived adduct of claim 2 wherein the methoxypolyoxyethylene monols have a molecular weight of about 350 to about 750, and the polyoxyethylene-polyoxypropylene monols have a molecular weight of about 270 to about 3930.

4. The polyisocyanate derived adduct of claim 2 wherein the capping agent is selected from the group consisting of methoxypolyoxyethylene monols, and mixtures of methoxy-polyoxyethylene monols with polyoxyethylene-polyoxypropylene monols.

5. The polyisocyanate derived adduct of claim 4 wherein the urethane prepolymer and the capping agent are present in a weight ratio of urethane prepolymer to capping agent of about 2:1 to about 1:2.

6. The polyisocyanate derived adduct of claim 4 wherein the dihydroxy functional polyol and the 4,4'-diphenyl methane diisocyanate are present in a weight ratio of dihydroxy functional polyol to 4,4'-diphenyl methane diisocyanate of about 2:1 to about 25:1.

7. The polyisocyanate derived adduct of claim 2 wherein the capping agent is polyoxyethylene-polyoxypropylene monol, and the capping agent and the urethane prepolymer are present in a weight ratio of the capping agent to the prepolymer of about 1:1 to about 1:3.

8. The polyisocyanate derived adduct of claim 1 wherein the dihydroxy functional polyol is polyoxyethylene glycol and the capping agent is a methoxypolyoxyethylene monol.

9. The polyisocyanate derived adduct of claim 1 wherein the dihydroxy functional polyol is polyoxyethylene-polyoxypropylene glycol and the capping agent is selected from the group consisting of methoxypolyoxyethylene monol, and mixtures of methoxypolyoxyethylene monol with polyoxyethylene-polyoxypropylene monol.

10. An emulsifiable polyisocyanate comprising an isocyanate and a polyisocyanate derived adduct comprising the reaction product of a urethane prepolymer and a capping agent,
the capping agent selected from the group consisting of a methoxypolyoxyethylene monols, polyoxyethylene-polyoxypropylene monols, and mixtures thereof, and
wherein the urethane prepolymer is the reaction product of a dihydroxy functional polyol and 4,4'-diphenyl methane diisocyanate.

11. The emulsifiable polyisocyanate of claim 10 wherein the dihydroxy functional polyol is selected from the group consisting of polyoxyethylene glycol and polyoxyethylene polyoxypropylene glycols.

12. The emulsifiable polyisocyanate of claim 11 wherein the methoxypolyoxyethylene monols have a molecular weight of about 350 to about 750, and the polyoxyethylene-polyoxypropylene monols have a molecular weight of about 270 to about 3930.

13. The emulsifiable polyisocyanate of claim 11 wherein the capping agent is selected from the group consisting of methoxypolyoxyethylene monols, and mixtures of methoxy-polyoxyethylene monols with polyoxyethylene-polyoxypropylene monols.

14. The emulsifiable polyisocyanate of claim 13 wherein the urethane prepolymer and the capping agent are present in a weight ratio of urethane prepolymer to capping agent of about 2:1 to about 1:2.

15. The emulsifiable polyisocyanate of claim 13 wherein the dihydroxy functional polyol and the 4,4'-diphenyl methane diisocyanate are present in a weight ratio of dihydroxy functional polyol to 4,4'-diphenyl methane diisocyanate of about 2:1 to about 25:1.

16. The emulsifiable polyisocyanate of claim 11 wherein the capping agent is polyoxyethylene-polyoxypropylene monol, and the capping agent and the urethane prepolymer are present in a weight ratio of the capping agent to the prepolymer of about 1:1 to about 1:3.

17. The emulsifiable polyisocyanate of claim 10 wherein the dihydroxy functional polyol is polyoxyethylene glycol and the capping agent is a methoxypolyoxyethylene monol.

18. The emulsifiable polyisocyanate of claim 10 wherein the dihydroxy functional polyol is polyoxyethylene-polyoxypropylene glycol and the capping agent is selected from the group consisting of methoxypolyoxyethylene monol, and mixtures of methoxypolyoxyethylene monol with polyoxyethylene-polyoxypropylene monol.

19. An aqueous emulsion comprising an emulsifiable polyisocyanate, the emulsifiable polyisocyanate comprising an isocyanate and a polyisocyanate derived adduct, the adduct comprising the reaction product of a urethane prepolymer and a capping agent,
the capping agent selected from the group consisting of a methoxypolyoxyethylene monols, polyoxyethylene-polyoxypropylene monols, and mixtures thereof, and
wherein the urethane prepolymer is the reaction product of a dihydroxy functional polyol and 4,4'-diphenyl methane diisocyanate.

20. The aqueous emulsion of claim 19 wherein the dihydroxy functional polyol is selected from the group consisting of polyoxyethylene glycol and polyoxyethylene polyoxypropylene glycols.

21. The aqueous emulsion of claim 20 wherein the methoxypolyoxyethylene monols have a molecular weight of about 350 to about 750, and the polyoxyethylene-polyoxypropylene monols have a molecular weight of about 270 to about 3930.

22. The aqueous emulsion of claim 20 wherein the urethane prepolymer and the capping agent is selected from the group consisting of methoxypolyoxyethylene monols, and mixtures of methoxypolyoxyethylene monols with polyoxyethylene-polyoxypropylene monols.

23. The aqueous emulsion of claim 22 wherein the urethane prepolymer and the capping agent are present in a weight ratio of urethane prepolymer to capping agent of about 2:1 to about 1:2.

24. The aqueous emulsion of claim 22 wherein the dihydroxy functional polyol and the 4,4'-diphenyl methane diisocyanate are present in a weight ratio of dihydroxy functional polyol to 4,4'-diphenyl methane diisocyanate of about 2:1 to about 25:1.

25. The aqueous emulsion of claim 20 wherein the capping agent is polyoxyethylene-polyoxypropylene monol, and the capping agent and the urethane prepolymer are present in a weight ratio of the capping agent to the prepolymer of about 1:1 to about 1:3.

26. The aqueous emulsion of claim 19 wherein the dihydroxy functional polyol is polyoxyethylene glycol and the capping agent is a methoxypolyoxyethylene monol.

27. The aqueous emulsion of claim 19 wherein the dihydroxy functional polyol is polyoxyethylene-polyoxypropylene glycol and the capping agent is selected from the group consisting of methoxypolyoxyethylene monol, and mixtures of methoxypolyoxyethylene monol with polyoxyethylene-polyoxypropylene monol.

28. An emulsifiable polyisocyanate comprising the reaction product of polymeric methane diphenyl diisocyante, methoxypolyoxyethylene monol, and a polyisocyanate derived adduct, the adduct comprising the reaction product of a urethane prepolymer and a methoxypolyoxyethylene monol,
wherein the urethane prepolymer is the reaction product of a dihydroxy functional polyol and an isocyanate.

29. The emulsifiable polyisocyanate of claim 28 wherein the polymeric methane diphenyl diisocyante is present in an amount of about 92 wt. %, the methoxypolyoxyethylene monol is present in an amount of about 4 wt. %, and the polyisocyanate derived adduct is present in an amount of about 4 wt. %.

30. The emulsifiable polyisocyanate of claim 29 wherein the dihydroxy functional polyol is polyoxyethylene glycol.

31. The emulsifiable polyisocyanate of claim 30 wherein the methoxypolyoxyethylene monol has a molecular weight of about 350.

32. An emulsifiable polyisocyanate comprising the reaction product of uretonimine modified 4,4'-diphenylmethane diisocyanate having about 26% NCO, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate.

33. The emulsifiable polyisocyanate of claim 32 wherein the modified diisocyante is present in an amount of about 90 wt. %, the methoxypolyoxyethylene monol is present in an amount of about 6 wt. %, and the polyisocyanate derived adduct is present in an amount of about 4 wt. %.

34. The emulsifiable polyisocyanate of claim 33 wherein the dihydroxy functional polyol is polyoxyethylene glycol.

35. The emulsifiable polyisocyanate of claim 34 wherein the methoxypolyoxyethylene monol has a molecular weight of about 350.

36. An emulsifiable polyisocyanate comprising the reaction product of uretonimine modified 4,4'-diphenylmethane diisocyante having a NCO value of about 29.3%, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate.

37. The emulsifiable polyisocyanate of claim 36 wherein the uretomine modified diisocyante is present in an amount of about 92 wt. %, the methoxypolyoxyethylene monol is present in an amount of about 4 wt. %, and the polyisocyanate derived adduct is present in an amount of about 4 wt. %.

38. The emulsifiable polyisocyanate of claim 37 wherein the dihydroxy functional polyol is polyoxyethylene glycol.

39. The emulsifiable polyisocyanate of claim 38 wherein the methoxypolyoxyethylene monol has a molecular weight of about 750.

40. An aqueous latex emulsion having improved potlife comprising an aqueous latex emulsion and an emulsifiable isocyanate, the emulsifiable polyisocyanate selected from the group consisting of
a. a first reaction product of polymeric methane diphenyl diisocyante, methoxypolyoxyethylene monol, and a polyisocyanate derived adduct, the adduct comprising the reaction product of a urethane prepolymer and a methoxypolyoxyethylene monol, wherein the urethane prepolymer is the reaction product of a dihydroxy functional polyol and an isocyanate,
b. a second reaction product of product of uretomine modified 4,4'-diphenylmethane diisocyanate having about 26% NCO, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate,
c. a third reaction product of uretonimine modified 4,4'-diphenylmethane diisocyanate having a NCO value of about 29.3%, and a mixture of methoxypolyoxyethylene monol and a polyisocyanate derived adduct comprising the reaction product of a urethane prepolymer and a methoxypolyoxyethylene monol, wherein the urethane prepolymer is the reaction product of a dihydroxy functional polyol and an isocyanate.

41. The emulsion of claim 40 wherein in the first reaction product the polymeric methane diphenyl diisocyante is present in an amount of about 92 wt. %, the methoxypolyoxyethylene monol is present in an amount of about 4 wt. %, and the polyisocyanate derived adduct is present in an amount of about 4 wt. %.

42. The emulsion of claim 41 wherein the dihydroxy functional polyol is polyoxyethylene glycol, and the methoxypolyoxyethylene monol has a molecular weight of about 350.

43. The emulsion of claim 40 wherein in the second reaction product the modified diisocyante is present in an amount of about 90 wt. %, the methoxypolyoxyethylene monol is present in an amount of about 6 wt. %, and the polyisocyanate derived adduct is present in an amount of about 4 wt. %.

44. The emulsion of claim 43 wherein the dihydroxy functional polyol is polyoxyethylene glycol and the methoxypolyoxyethylene monol has a molecular weight of about 350.

45. The emulsion of claim 40 wherein in the third reaction product the uretomine modified diisocyante is present in an amount of about 92 wt. %, the methoxypolyoxyethylene monol is present in an amount of about 4 wt. %, and the polyisocyanate derived adduct is present in an amount of about 4 wt. %.

46. The emulsion of claim 45 wherein the dihydroxy functional polyol is polyoxyethylene glycol and the methoxypolyoxyethylene monol has a molecular weight of about 750.

47. An emulsifiable polyisocyanate comprising,
the reaction product of polymeric methane diphenyl diisocyante, a polyisocyanate derived adduct wherein the adduct is the reaction product of a urethane prepolymer formed by reacting a urethane prepolymer of polyoxyethylene-polyoxypropylene glycol and 4,4'-diphenylmethane diisocyanate with a first methoxypolyoxyethylene monol having a molecular weight, a polyoxypropylene glycol and a second methoxypolyoxyethylene monol having a molecular weight different from the molecular weight of the first methoxypolyoxyethylene.

48. The emulsifiable isocyanate of claim 47 wherein the polymeric methane diphenyl diisocyante is present in an amount of about 93%, the polyisocyanate derived adduct is present in an amount of about 3%, the polyoxypropylene glycol is present in an amount of about 1.5%, and the second methoxypolyoxyethylene monol is present in an amount of about 2.5%.

49. The emulsifiable isocyanate of claim 48 wherein the polyoxypropylene glycol has a molecular weight of abut 725, and the second methoxypolyoxyethylene monol has a molecular weight of about 750.

50. An emulsion comprising an emulsifiable polyisocyanate comprising,
a liquid vehicle and the reaction product of polymeric methane diphenyl diisocyante, a polyisocyanate derived adduct wherein the adduct is the reaction product of a urethane prepolymer formed by reacting a urethane prepolymer of polyoxyethylene-polyoxypropylene glycol and 4,4'-diphenylmethane diisocyanate with a first methoxypolyoxyethylene monol having a molecular weight of about 550, polyoxypropylene glycol and a second methoxypolyoxyethylene monol having a molecular weight of about 750.

51. The emulsion of claim 50 wherein the liquid vehicle is selected from water and castor oil.

52. The emulsion of claim 51 wherein the polymeric methane diphenyl diisocyante is present in an amount of about 93%, the polyisocyanate derived adduct is present in an amount of about 3%, the polyoxypropylene glycol is present in an amount of about 1.5%, and the second methoxypolyoxyethylene monol is present in an amount of about 2.5%.

53. The emulsion of claim 52 wherein the polyoxypropylene glycol has a molecular weight of abut 725.

54. The emulsion of claim 53 wherein the liquid vehicle is water.

55. The emulsion of claim 53 wherein the liquid vehicle is castor oil.

* * * * *